United States Patent Office 3,539,272
Patented Nov. 10, 1970

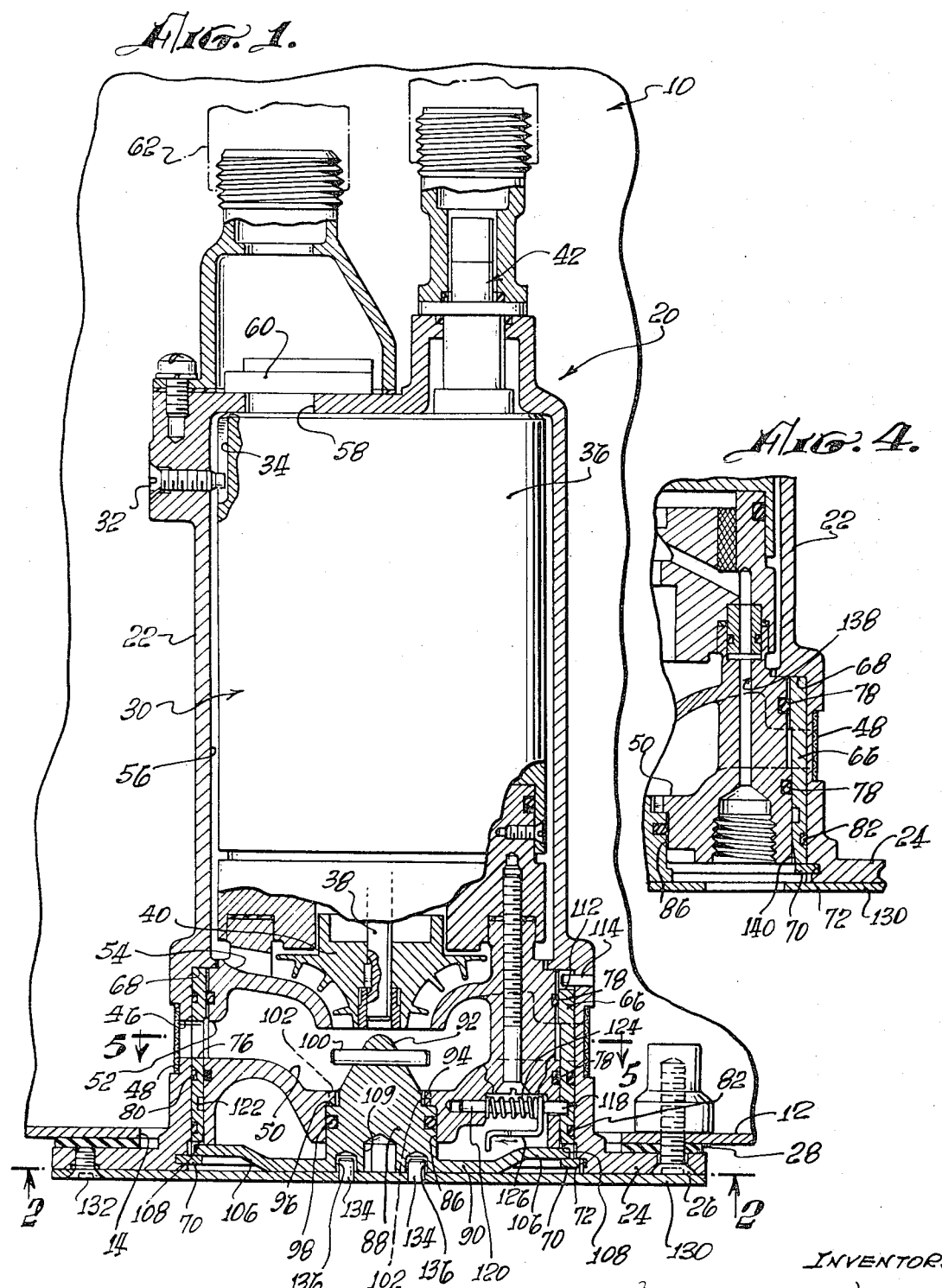

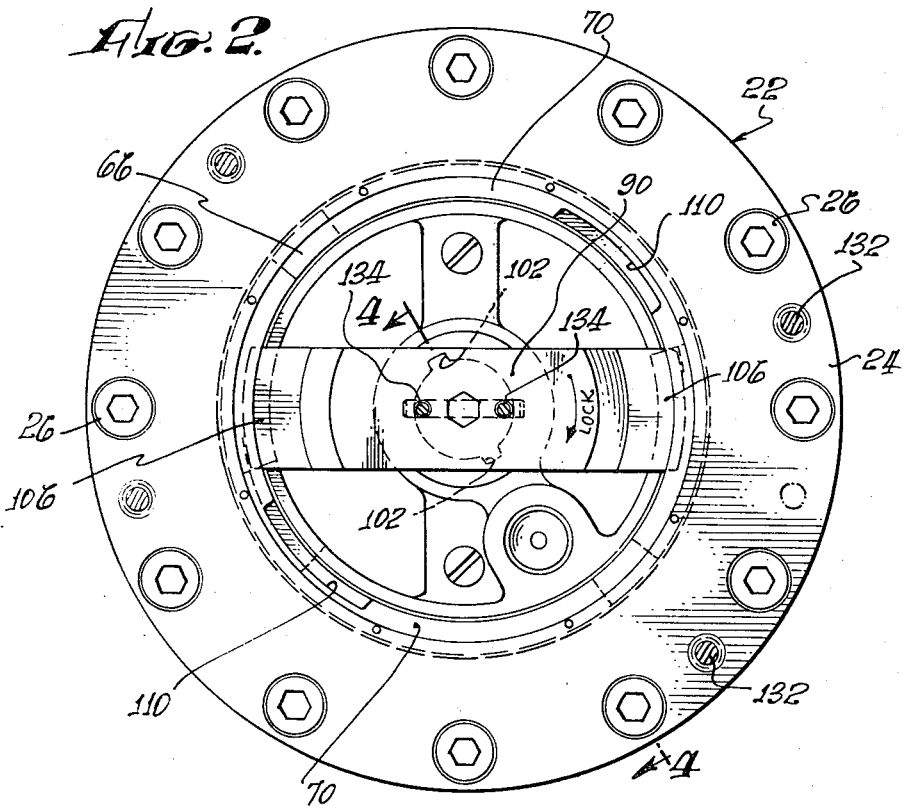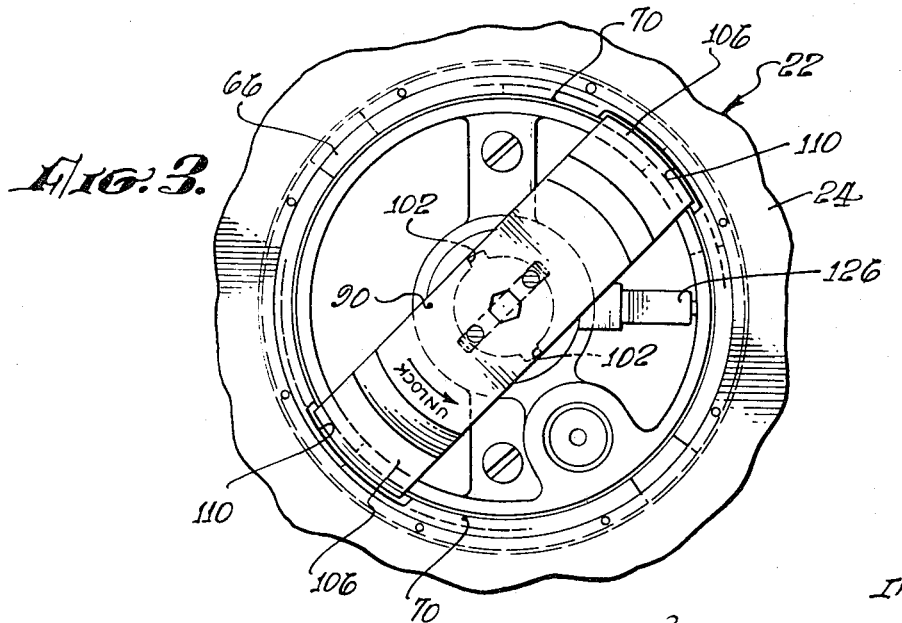

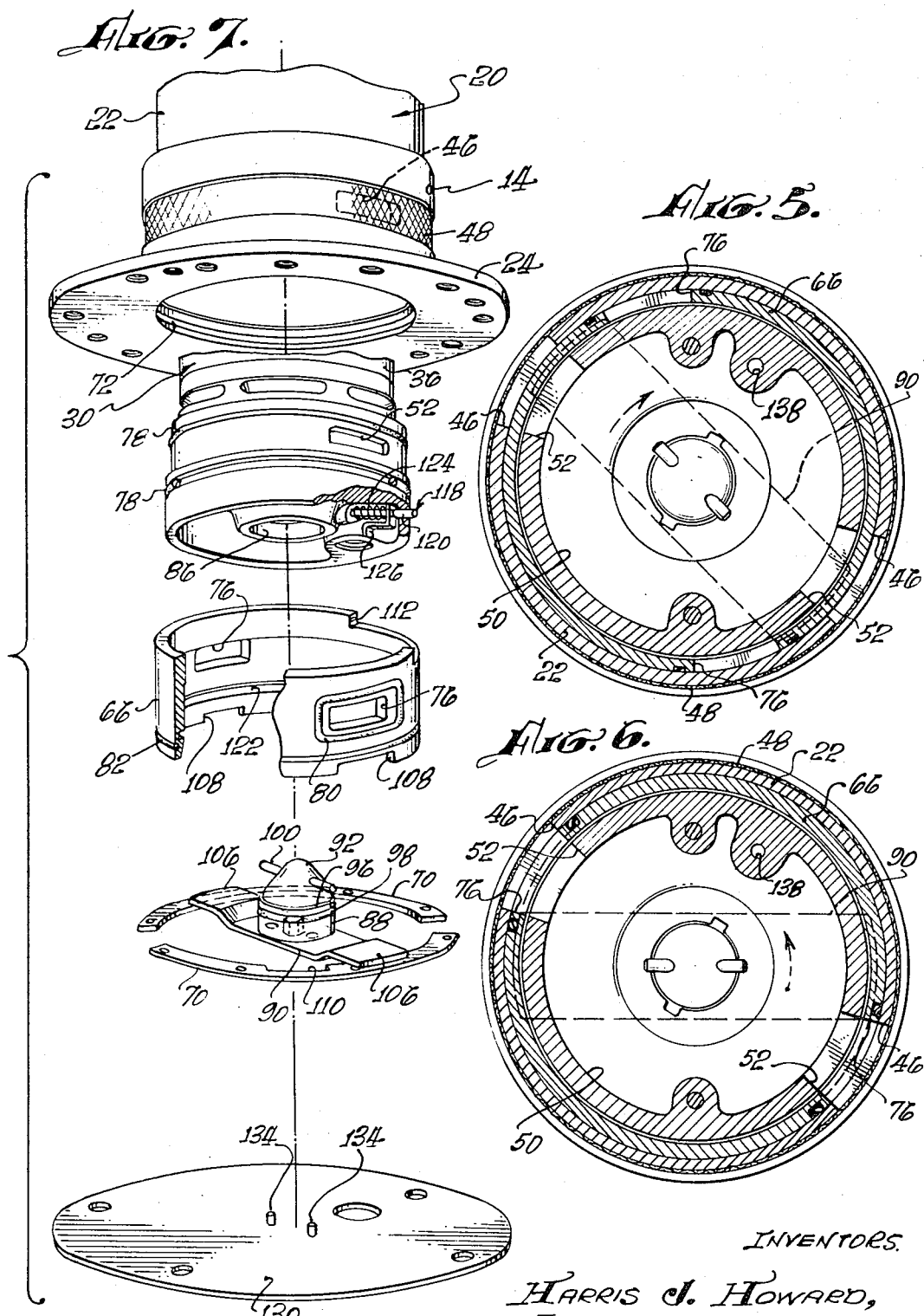

3,539,272
CANISTER PUMP ASSEMBLY
Harris J. Howard, Granada Hills, and Nicholas de Kiss, North Hollywood, Calif., assignors to De Laval Turbine California Inc., Burbank, Calif., a corporation of California
Filed Dec. 26, 1968, Ser. No. 786,985
Int. Cl. F04b 21/00; F04d 13/02; G01f 11/36
U.S. Cl. 415—168       8 Claims

ABSTRACT OF THE DISCLOSURE

A canister pump assembly for an aircraft fuel tank: A canister having an open lower end is disposed within the tank and is mounted on the lowest part thereof. A motor-driven booster pump is disposed in the canister and is removable through its lower end. A sleeve valve in the lower end of the canister is rotatable between an open position, wherein it connects an inlet in the canister to the pump inlet, and a closed position. An actuator is rotatable about the axis of the canister between locked and unlocked positions to rotate the sleeve valve between its open and closed positions, respectively. Retainers on the lower end of the canister prevent withdrawal of the actuator when it is in its locked position and the sleeve valve is in its open position. The actuator blocks the lower end of the canister so that it prevents withdrawal of the pump when the actuator is locked and the sleeve valve is open. The lower end of the pump is provided with a drain for the pump inlet, which drain is closed by a plug on the actuator until the actuator is withdrawn from the canister. A closure for the lower end of the canister is provided with a locking device which prevents rotation of the actuator out of its locked position when the closure is in place.

The foregoing combination of parts insures error-free removal and replacement of the motor-driven booster pump.

BACKGROUND OF THE INVENTION

The present invention relates in general to motor-driven pumps for submerged operation and, more particularly, to a motor-driven pump for submerged operation in a reservoir, tank, or the like. Since the invention has been embodied in and is particularly applicable to a motor-driven booster pump for submerged operation in an aircraft fuel tank, it will be considered in such connection herein as a matter of convenience.

Aircraft fuel booster pumps are normally installed at the lowest points in the fuel tanks of the airplane. If such a booster pump is mounted directly in the fuel tank, the tank must be drained in the event that the pump requires repair or replacement. Draining the tank is a somewhat hazardous operation and is time consuming, which is a serious matter since airplane down time is expensive, especially for a commercial passenger carrier.

Problems of the foregoing nature can be eliminated through the use of a canister pump assembly, wherein the motor-driven booster pump is placed in a canister disposed within the fuel tank and mounted on the lowest part thereof, the canister having an open lower end through which the pump may be installed and removed. The canister is provided with suitable valving for isolating any fuel in the tank from the pump. With this type of installation, maintenance is greatly facilitated since it is unnecessary to empty the fuel tank, whenever servicing, repair, or replacement of the pump is necessary.

SUMMARY AND OBJECTS OF INVENTION

In view of the foregoing background, the primary object of the invention is to provide a canister pump assembly having a valved canister permitting installation and removal of the motor-driven booster pump without draining the fuel tank.

More particularly, an important object of the invention is to provide a canister pump assembly which requires performing specific sequences of operations in removing and installing the pump to insure error-free servicing, repair or replacement of the pump. Merely as examples, the invention precludes any possibility of inadvertently dumping fuel from the tank in removing the pump, or of inadvertently failing to connect the inlet of the pump to the tank in installing the pump, which are important features.

Summarizing the invention, an important object thereof is to provide a canister pump assembly which includes: a canister having an upper end and having an open lower end spaced axially below its upper end, the canister having a canister inlet adjacent its lower end and having a canister outlet; a motor-driven pump in the canister, the pump having a pump inlet adjacent its lower end and connectible to the canister inlet and having a pump outlet in communication with the canister outlet; a sleeve valve in the lower end of the canister and encircling the lower end of the pump, the valve being rotatable about the axis of the canister between open and closed positions and being provided with port means for connecting the pump inlet to the canister inlet when the valve is in its open position; and means for rotating the valve between its open and closed positions and for retaining the pump in the canister against withdrawal when the valve has been rotated to its open position.

With the foregoing construction, the pump cannot be secured in the canister against withdrawal without connecting the pump inlet to the canister inlet leading to the fuel tank, which is an important feature. Another important feature resides in the use of a sleeve valve in the lower end of the canister and encircling the lower end of the pump, the pump being withdrawable through the sleeve valve when the latter is in its closed position. This results in a very compact valving arrangement.

Continuing to summarize the invention, still another important object is to provide a canister pump assembly wherein the means for rotating the valve and for retaining the pump in the canister when the valve is open, comprises: an actuator engageable with the valve and rotatable about the axis of the canister between locked and unlocked positions corresponding respectively to the open and closed positions of said valve; retaining means on the canister adjacent the lower end thereof and engageable by the actuator for preventing withdrawal of the actuator from the lower end of the canister when the actuator is in its locked position and the valve is in its open position; and the actuator blocking the lower end of the canister so that it prevents withdrawal of the pump from the lower end of the canister when the actuator is in its locked position and the valve is in its open position. With this construction, the valve actuator cannot be withdrawn from the canister to release the pump as long as the valve actuator is in its locked position to place the valve in its open position.

Another important object is to provide the lower end of the pump with a pump drain communicating with the pump inlet, and to provide the actuator with means for closing the pump drain when the actuator is in its locked position to place the valve in its open position. With this construction, the valve actuator cannot be withdrawn from the canister until it is rotated into its unlocked position to close the valve, thereby positively insuring against inadvertent dumping of fuel from the tank. After the actuator has been turned to its unlocked position, it can be removed to permit draining fuel from the pump inlet through the pump drain which is normally closed by the actuator.

Yet another important object is to provide a canister pump assembly which includes: a closure for the lower end of the canister; means for connecting the closure to the lower end of the canister; and interengageable locking means on the closure and the actuator for preventing rotation of the actuator when the closure is connected to the lower end of the canister with the actuator in its locked position.

With the foregoing construction, the closure for the lower end of the canister cannot be installed if the actuator is not in its locked position to place the valve in its open position. This positively precludes completing the installation of the pump without opening the valve, which is an important feature.

The foregoing objects, advantages, features and results of the present invention, together with various other objects, advantages, features and results thereof which will be evident to those skilled in the aircraft fuel booster pump art, and releated arts, in the light of this disclosure, may be achieved with the exemplary embodiment of the invention illustrated in the accompanying drawings and described in detail hereinafter.

DESCRIPTION OF DRAWINGS

In the drawings:

FIG. 1 is a view, partially in vertical section and partially in side elevation, illustrating a canister pump assembly which embodies the invention;

FIGS. 2 and 3 are sectional views both taken as indicated by the arrowed line 2—2 of FIG. 1 and respectively showing various parts in different positions;

FIG. 4 is a fragmentary vertical sectional view taken as indicated by the arrowed line 4—4 of FIG. 2;

FIGS. 5 and 6 are sectional views both taken as indicated by the arrowed line 5—5 of FIG. 1 and respectively showing various parts in different positions; and FIG. 7 is an exploded perspective view of the canister pump assembly of the invention.

DETAILED DESCRIPTION OF EXEMPLARY EMBODIMENT OF INVENTION

Referring initially to FIG. 1 of the drawing, fragmentarily illustrated therein is an aircraft fuel tank 10 having a bottom wall 12 provided with an opening 14. The canister pump assembly of the invention, designated generally by the numeral 20, projects upwardly into the fuel tank 10 through the opening 14 and is mounted on the bottom wall 12 of the tank.

More particularly, the canister pump assembly 20 includes a canister 22 which projects upwardly into the fuel tank 10 through the opening 14 and which has an open lower end encircled by an external annular flange 24 located below the bottom wall 12 and suitably secured thereto, as by bolts 26. A suitable gasket 28 is interposed between the flange 24 and the tank wall 12.

Disposed within the canister 22 is a motor-driven booster pump 30 which is supported in the canister in a manner to be described hereinafter. A screw 32 extending horizontally into the canister 22 adjacent the upper end thereof is receivable in a vertical notch 34 in the upper end of the motor-driven pump 30 to orient the latter circumferentially.

The motor-driven pump 30 is provided at its upper end with an electric motor 36 having a depending shaft 38 carrying and driving a pump impeller 40. A suitable plug-in type of electrical connection 42 on the upper end of the motor 36 and the upper end of the canister 22 provides electrical power to the motor.

The canister 22 is provided adjacent its lower end with circumferentially spaced canister inlets or inlet ports 46 covered by an annular screen 48 encircling the canister. The motor-driven pump 30 is provided adjacent its lower end with a pump inlet 50 comprising circumferentially spaced inlet ports 52 radially opposite the canister inlets 46, as best shown in FIGS. 5 and 6. Fuel entering the pump inlet 50, in a manner to be described, is discharged by the pump impeller 40 through a pump outlet 54 into a clearance space 56 around the motor 36 and between it and the canister 22. The canister is provided at its upper end with a canister outlet 58 which is equipped with a flapper check-valve 60 and through which the pumped fuel flows from the clearance space 56 into an outlet line 62.

Disposed in the lower end of the canister 22, and encircling the lower end of the pump 30, is a sleeve valve 66 which is rotatable about the axis of the canister. The sleeve valve 66 is seated at its upper end against an internal annular shoulder 68 in the canister 22. The lower end of the sleeve valve 66 is seated on two circumferentially spaced, crescent-shaped retainers 70 which are pinned in, or otherwise secured in, an internal annular groove 72 in the canister 22 below the sleeve valve.

The sleeve valve 66 is provided therethrough with circumferentially spaced valve ports or port means 76 which, as best shown in FIG. 6, connect the pump inlet ports 52 to the canister inlets 46 when the sleeve valve is in its open position. As shown in FIG. 5, when the sleeve valve is rotated about the canister axis into its closed position, through an angle of, for example, 45°, the valve ports 76 are circumferentially displaced out of register with the canister inlets 46 and the pump inlet ports 52.

To prevent leakage, suitable seals 78 encircle and are carried in grooves in the lower end of the motor-driven pump 30 above and below the pump inlet ports 52. Other seals 80 surround the valve ports 76 and are carried in grooves in the sleeve valve 66. Also, a seal 82 encircles and is carried in a groove in the sleeve valve 66 below the seals 80 around the valve ports 76.

The pump 30 is provided in its lower end with a central pump drain or drain port 86 which communicates with the pump inlet 50 and through which the pump may be drained after the sleeve valve 66 has been closed and before the pump is removed. Normally, the pump drain 86 is closed by an upwardly extending, central plug or plug means 88 on a valve actuator 90 for rotating the sleeve valve 66 between its open and closed positions corresponding respectively to locked and unlocked positions of the valve actuator, as will be discussed hereinafter. The plug 88 is provided with a tapered nose portion 92 of a size to pass upwardly through an internal annular flange 94 encircling the pump drain 86 at its upper end. When the valve actuator 90 is in place, an external annular shoulder 96 on the plug 88 is seated against the lower side of the internal flange 94. An O-ring 98 in an external annular groove in the plug 88 surrounds the plug and engages the wall of the pump drain 86 to prevent leakage. The nose portion 92 of the plug 88 carries a transverse pin 100 the ends of which must pass through notches 102 in the flange 94 when inserting the plug 88 into and withdrawing it from the pump drain 86. Thus, the pin prevents the valve actuator 90 from falling out until the pin 100 is lined up with the notches 102.

The valve actuator 90 includes diametrically opposed arms the ends of which are seated on the retainers 70, when the valve actuator is in its locked position, to retain the motor-driven pump 30 within the canister 22. The ends of the arms 106 also extend into notches 108 in the lower end of the sleeve valve 66 so that, as the valve actuator 90 is rotated between its locked and unlocked positions, it rotates the sleeve valve between its open and closed positions, respectively. FIGS. 2 and 3 respectively show the valve actuator 90 in its locked and unlocked positions, and FIGS. 6 and 5, respectively, show the sleeve valve 66 in its open and closed positions, corresponding respectively to the locked and unlocked positions of the valve actuator. (In FIGS. 1, 4 and 7, the sleeve valve 66 is open and the valve actuator 90 is locked.) The valve actuator 90 may be rotated by means of a suitable tool (not shown) plugged into a socket 109 therein.

When the valve actuator 90 is in its unlocked position, corresponding to the closed position of the sleeve valve 66, the ends of the arms 106 of the valve actuator register with diametrally opposed notches 110 in the retainers 70. These notches permit downward movement of the valve actuator 90 to a level below the retainers 70 when the valve actuator is in its unlocked position. Subsequently, the plug 88 may be withdrawn from the pump drain 86 to permit draining of the pump 30. During draining of the pump 30 no fuel can escape from the tank 10 since the valve actuator 90 rotated the sleeve valve 66 into the closed position of the sleeve valve as the valve actuator was rotated into its unlocked position, which is an important feature. When the valve actuator 90 is in its unlocked position, the ends of the pin 100 are out of alignment with the notches 102 in the flange 94 so that the valve actuator will not fall out while the pump 30 is being drained, further rotation of the valve actuator being required to permit complete withdrawal thereof, which is another important feature.

It will be noted that the upper end of the sleeve valve 66 is provided therein with a notch 112 receiving a pin 114 carried by the canister 22. This pin and notch combination limit the angular displacement of the sleeve valve 66 and the valve actuator 90 between the open and closed positions of the sleeve valve and the locked and unlocked positions of the valve actuator. This angular displacement may be of the order, for example, of 45°.

The motor-driven pump 30 is temporarily releasably retained in the canister 22, even when the valve actuator 90 is not in its locked position to retain it, by a retaining means 118 comprising interengageable elements on the pump and the sleeve valve 66. More particularly, the retaining means 118 is shown as including a radially slidable pin 120 carried by the lower end of the pump 30 and having an outer end insertable into an internal annular groove 122 in the sleeve valve 66 to temporarily support the pump 30. The pin 120 is biased radially outwardly by a compression spring 124 which encircles it, and may be moved radially inwardly to unlatch the pump 30 by means of a finger piece 126.

Closing the lower end of the canister 22 is a closure means or plate 130 which is seated against the lower side of the external flange 24 on the canister, the closure plate being secured to such flange by screws 132, or the like, so arranged that the closure plate can be fastened in one angular position only. The closure plate 130 is provided with locking means, shown as comprising two diametrally opposed locking pins 134 receivable by complementary openings 136 in the valve actuator 90, for preventing rotation of the valve actuator 90 out of its locked position, and for thus preventing rotation of the sleeve valve 66 out of its open position. With this construction, when the closure plate 130 is installed, there is complete assurance that the sleeve valve 66 is open to admit fuel from the tank 10 to the pump inlet 50, which is an important feature.

The motor-driven pump 30 is preferably provided, as is conventional, with a shaft seal, not shown, between the motor 36 and the pump impeller 40. FIG. 4 shows a drain passage 138 for fuel leaking past such shaft seal.

EXPLANATION OF OPERATION OF EXEMPLARY EMBODIMENT OF INVENTION

Various components of the canister pump assembly 20, and particularly the sleeve valve 66, the retainers 70, the valve actuator 90 and the closure plate 130, are so related that removal and installation of the motor-driven pump 30 require specific sequences of operations which make errors impossible and which are important features of the invention. In considering the operation of the invention, the sequence of operations for removal of the pump 30 will be considered first, and then the sequence of operations for installation thereof will be considered.

In removing the motor-driven pump 30, the first step is to remove the closure plate 130, which releases the valve actuator 90. The latter is then rotated into its unlocked position, which simultaneously closes the sleeve valve 66, and is then pulled downwardly to open the pump drain 86, which drains the pump 30, without, however, losing any fuel from the tank 10. Thereafter, the valve actuator 90 may be rotated into a position to permit withdrawal of the ends of the pin 100 through the notches 102. Subsequently, the retaining pin 120 may be retracted, by means of the finger piece 126, to release the pump 30, which can then be withdrawn from the canister 22.

In installing the motor-driven pump 30, the reverse procedure is followed. More particularly, the pump 30 is inserted into the canister 22 with an angular orientation such that the indexing screw 32 enters the notch 34, which insures that the electrical connection 42 will be made. The outer end of the retaining pin 120 ultimately enters the internal annular groove 122 in the sleeve valve 66 to temporarily support the pump 30, the lower end of the sleeve valve 66 preferably being internally beveled, as indicated at 140 in FIG. 4, so that the retaining pin 120 will automatically retract and then snap into the groove 122 as insertion of the pump 30 is completed. Next, the ends of the pin 100 are inserted upwardly through the notches 102 and the plug 88 is inserted into the pump drain 86. As this is done, the ends of the arms 106 of the valve actuator 90 pass upwardly through the notches 110 in the retainers 70 and into the notches 108 in the lower end of the sleeve valve 66. The pump drain 86 is now plugged, and the valve actuator 90 may be turned to rotate the sleeve valve 66 into its open position, it being noted that this cannot be done until the pump drain 86 is plugged. Thereafter, the closure plate 130 is installed to lock the valve actuator 90 against rotation which would displace the sleeve valve 66 out of its open position. In this connection, it will be noted that the closure plate 130 cannot be installed unless the valve actuator 90 is in its locked position and the sleeve valve 66 is in its open position.

Thus, foolproof installation and removal sequences are provided which positively preclude errors in installing and removing the motor-driven pump 30, which are important features of the invention.

Although an exemplary embodiment of the invention has been disclosed herein for purposes of illustration, it will be understood that various changes, modification and substitutions may be incorporated in such embodiment.

We claim as our invention:
1. In a canister pump assembly, the combination of:
 (a) a canister having a canister inlet and a canister outlet;
 (b) a motor-driven pump in said canister, said pump having a pump inlet connectible to said canister inlet and having a pump outlet in communication with said canister outlet;
 (c) a valve movable in said canister between open and closed positions and provided with port means for connecting said pump inlet to said canister inlet when said valve is in its open position;
 (d) actuating means for moving said valve between its open and closed positions;
 (e) said actuating means including means for draining said pump inlet when said actuating means has moved said valve to its closed position; and
 (f) retaining means engageable with said actuating means for retaining said pump in said canister against withdrawal when said actuating means has moved said valve to its open position.
2. A canister pump assembly as set forth in claim 1 including means for locking said actuating means relative to said canister when said actuating means has moved said valve to its open position.

3. In a canister pump assembly, the combination of:
(a) a canister having an upper end and having an open lower end spaced axially below its upper end, said canister having a canister inlet adjacent its lower end and having a canister outlet;
(b) a motor-driven pump in said canister, said pump having a pump inlet adjacent its lower end and connectible to said canister inlet and having a pump outlet in communication with said canister outlet;
(c) a sleeve valve in said lower end of said canister and encircling said lower end of said pump, said valve being rotatable about the axis of said canister between open and closed positions and being provided with port means for connecting said pump inlet to said canister inlet when said valve is in its open position; and
(d) means for rotating said valve between its open and closed positions and for retaining said pump in said canister against withdrawal when said valve has been rotated to its open position.

4. A canister pump assembly according to claim 3 wherein the means last defined includes:
(a) an actuator engageable with said valve and rotatable about the axis of said canister between locked and unlocked positions corresponding respectively to the open and closed positions of said valve;
(b) retaining means on said canister adjacent said lower end thereof and engageable by said actuator for preventing withdrawal of said actuator from said lower end of said canister when said actuator is in its locked position and said valve is in its open position; and
(c) said actuator blocking said lower end of said canister so that it prevents withdrawel of said pump from said lower end of said canister when said actuator is in its locked position and said valve is in its open position.

5. A canister pump assembly as defined in claim 4 wherein:

(a) said lower end of said pump is provided therein with a pump drain communicating with said pump inlet; and
(b) said actuator is provided thereon with means for closing said pump drain when said actuator is in its locked position and said valve is in its open position.

6. A canister pump assembly according to claim 4 including:
(a) a closure for said lower end of said canister;
(b) means for connecting said closure to said lower end of said canister; and
(c) interengageable locking means on said closure and said actuator for preventing rotation of said actuator when said closure is connected to said lower end of said canister with said actuator in its locked position.

7. A canister pump assembly as defined in claim 3 including releasable, interengageable means on said pump and said valve for retaining said pump in said canister against withdrawal when said valve has been rotated to its closed position.

8. A canister pump assembly according to claim 3 including:
(a) closure means for said lower end of said canister; and
(b) locking means on said closure means for preventing rotation of said valve out if its open position.

References Cited

UNITED STATES PATENTS

| | | | |
|---|---|---|---|
| 3,000,543 | 9/1961 | Paul | 222—333 |
| 3,172,365 | 3/1965 | Nasvytis | 103—87 |

ROBERT M. WALKER, Primary Examiner

U.S. Cl. X.R.

222—333